(12) United States Patent
Ohashi

(10) Patent No.: US 10,011,295 B2
(45) Date of Patent: Jul. 3, 2018

(54) STEERING SYSTEM

(71) Applicant: JTEKT CORPORATION, Osaka-shi, Osaka (JP)

(72) Inventor: Tatsuya Ohashi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/453,968

(22) Filed: Mar. 9, 2017

(65) Prior Publication Data
US 2017/0267277 A1    Sep. 21, 2017

(30) Foreign Application Priority Data

Mar. 17, 2016 (JP) ................................ 2016-054176

(51) Int. Cl.
| | |
|---|---|
| *B62D 5/04* | (2006.01) |
| *B62D 3/12* | (2006.01) |
| *F16F 15/08* | (2006.01) |
| *F16H 19/04* | (2006.01) |
| *F16F 1/373* | (2006.01) |

(Continued)

(52) U.S. Cl.
CPC ............. *B62D 5/0469* (2013.01); *B62D 3/12* (2013.01); *B62D 3/123* (2013.01); *B62D 3/126* (2013.01); *B62D 5/0424* (2013.01); *B62D 5/0448* (2013.01); *F16F 15/08* (2013.01); *F16H 19/04* (2013.01); *F16F 1/3732* (2013.01); *F16H 25/2204* (2013.01); *F16H 2019/046* (2013.01); *F16H 2025/2081* (2013.01); *F16H 2025/2096* (2013.01)

(58) Field of Classification Search
CPC ....... B62D 5/04; B62D 5/0424; B62D 5/0469
See application file for complete search history.

(56) References Cited

U.S. PATENT DOCUMENTS

| | | | |
|---|---|---|---|
| 8,925,939 B2 * | 1/2015 | Ohashi ..................... | B62D 3/12 280/93.514 |
| 9,302,697 B2 * | 4/2016 | Ohashi .................. | B62D 7/163 |

(Continued)

FOREIGN PATENT DOCUMENTS

| | | |
|---|---|---|
| DE | 10 2011 051 715 A1 | 1/2013 |
| DE | 102012024074 A1 | 6/2014 |

(Continued)

OTHER PUBLICATIONS

Aug. 28, 2017 Extended Search Report issued in European Patent Application No. 17161365.6.

*Primary Examiner* — Kevin Hurley
(74) *Attorney, Agent, or Firm* — Oliff PLC

(57) ABSTRACT

A steering system includes a rack housing in which a rack shaft is housed, rack ends fitted to respective end portions of the rack shaft and coupled to respective steered wheels, and shock-absorbing members provided between the rack housing and the respective rack ends. When the rack shaft moves in a direction in which an end face of the rack end approaches a restricting surface of the rack housing and thus the rack shaft reaches a position after the shock-absorbing member is compressed by a compression amount, a control unit creates a normal input end through electronic stopper control of reducing an assisting force to be generated by a motor. This restricts movement of the rack shaft in a direction in which the end face approaches the restricting surface.

8 Claims, 8 Drawing Sheets

(51) Int. Cl.
 *F16H 25/22* (2006.01)
 *F16H 25/20* (2006.01)

(56) References Cited

U.S. PATENT DOCUMENTS

2017/0113719 A1* 4/2017 Ohashi .................... B62D 3/12
2017/0267282 A1* 9/2017 Ogata ..................... B62D 3/12

FOREIGN PATENT DOCUMENTS

EP 0812755 A2 12/1997
EP 1864886 A2 12/2007

* cited by examiner

STEERING SYSTEM

INCORPORATION BY REFERENCE

The disclosure of Japanese Patent Application No. 2016-054176 filed on Mar. 17, 2016 including the specification, drawings and abstract, is incorporated herein by reference in its entirety.

BACKGROUND OF THE INVENTION

1. Field of the Invention

The invention relates to a steering system.

2. Description of the Related Art

There is a conventional steering system configured to transmit rotation of a steering shaft caused in response to an operation of a steering wheel to a rack-and-pinion mechanism, thereby changing the angle of steered wheels. The rack-and-pinion mechanism converts the rotational motion of the steering shaft into a linear motion of a rack shaft. Tie rods are pivotably coupled to respective end portions of the rack shaft via rack ends.

In a steering system including a rack-and-pinion mechanism, when a rack end comes into contact with a rack housing in which a rack shaft is housed, the movement stroke of the rack shaft is restricted, whereby the steering range of the steered wheels is mechanically restricted. When the rack end comes into contact with the rack housing, a high impact load may be applied to the steering system. In view of this, in a steering system described in, for example, German Patent Application Publication No. 10 2011 051 715 (DE 102011051715 A), an end damper is disposed between a rack end and a rack housing. The end damper absorbs an impact load that is generated when the rack end and the rack housing come into contact with each other, that is, an impact generated at the time of end contact.

In the steering system described in DE 102011051715 A, an impact load at the time of end contact is reliably reduced. However, at the time of end contact, the rack end and the rack housing come into contact with each other via an elastic member interposed therebetween. Thus, an elastic feel due to the elastic member at the time of end contact makes some drivers uncomfortable in operating a steering wheel. In other words, it is difficult to set the stroke limit position (stroke end) in a steering operation, when the elastic member is used to ensure sufficient shock-absorbing property.

SUMMARY OF THE INVENTION

One object of the invention is to provide a steering system including a shock-absorbing member, the steering system configured to clearly define a stroke end in a steering operation.

A steering system according to an aspect of the invention includes: a steering mechanism including a steered shaft configured to move in an axial direction of the steered shaft to steer steered wheels, and a steering shaft configured to rotate in response to a movement of the steered shaft in the axial direction; a motor configured to apply a steering assist force for steering the steered wheels to the steering mechanism; a housing in which the steered shaft is housed; an end member fitted to an end portion of the steered shaft, the end member being coupled to a corresponding one of the steered wheels; a shock-absorbing member provided between an end face of the housing and an end face of the end member in the axial direction of the steered shaft, the shock-absorbing member being configured to absorb an impact by being compressed; and a control unit configured to control the motor such that, when the shock-absorbing member and the end member come into contact with each other in a state where the shock-absorbing member still has a compression margin, generation of the steering assist force in a direction in which the shock-absorbing member is further compressed is stopped or reduced.

With this configuration, generation of the steering assist force is stopped or reduced when the steered shaft is at the position at which the shock-absorbing member and the end face of the end member come into contact with each other in the state where the shock-absorbing member still has a compression margin. Thus, the stroke end can be clearly defined at this position. This is because, for example, a force required for a driver to perform a steering operation increases, which gives the driver a blocked feel. When the steered shaft moves beyond the stroke end in the direction in which the shock-absorbing member is further compressed, the impact is absorbed by the shock-absorbing member as the shock-absorbing member is compressed by an amount corresponding to the compression margin.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
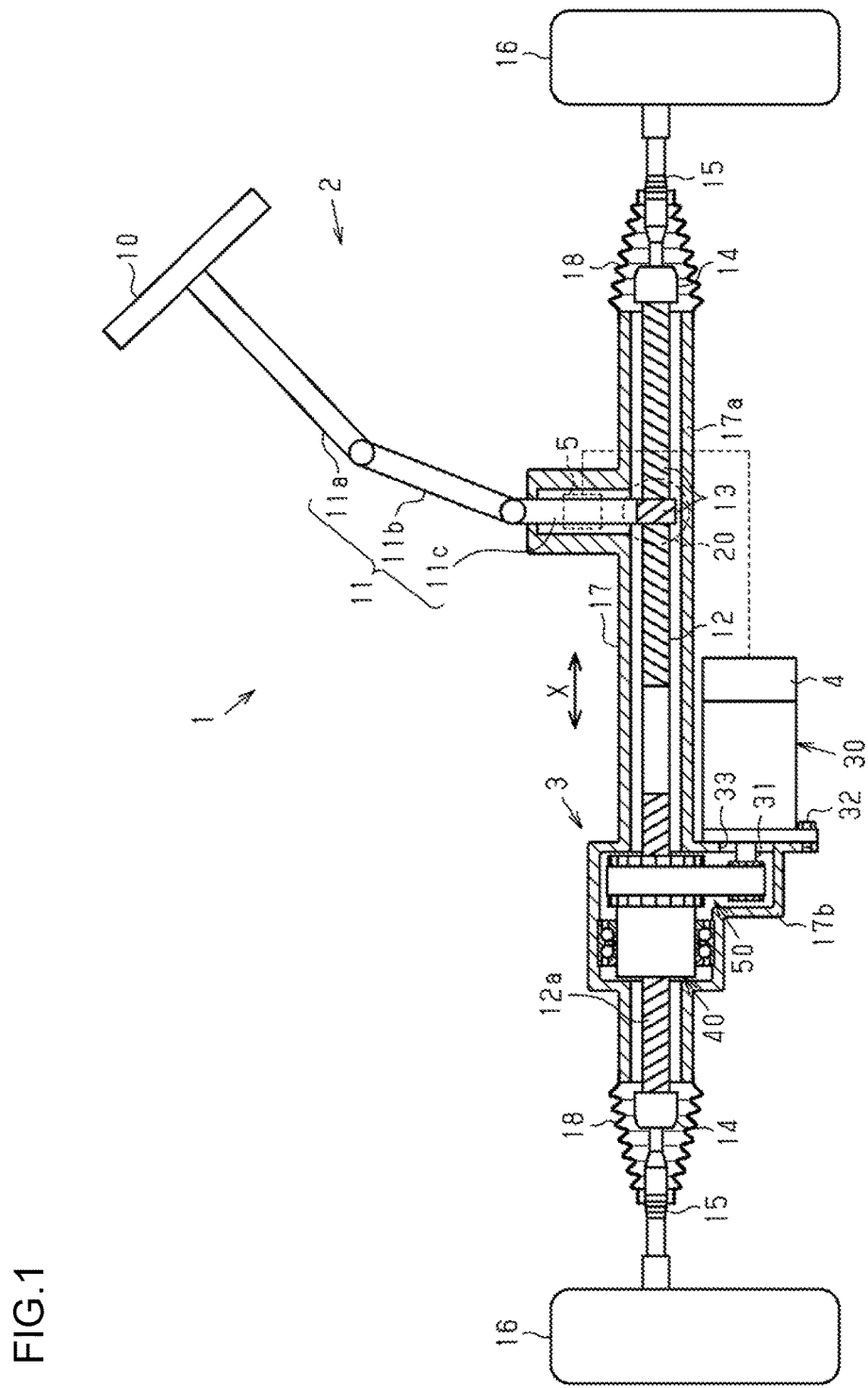
FIG. 1 is a diagram illustrating the schematic configuration of a steering system according to an embodiment.

Hereinafter, an electric power steering system (EPS) as an embodiment of a steering system will be described. As illustrated in FIG. 1, the EPS 1 includes a steering mechanism 2 that steers steered wheels 16 in response to a driver's operation of a steering wheel 10, an assist mechanism 3 that assists a driver in performing a steering operation, and an electronic control unit (ECU) 4 serving as a control unit that controls the assist mechanism 3.

The steering mechanism 2 includes a steering wheel 10 and a steering shaft 11 that rotates together with the steering wheel 10 in an integrated manner. The steering shaft 11 includes a column shaft 11a coupled to the steering wheel 10, an intermediate shaft 11b coupled to a lower-end portion of the column shaft 11a, and a pinion shaft 11c coupled to a lower-end portion of the intermediate shaft 11b. A lower-end portion of the pinion shaft 11c is coupled to a rack shaft 12, which may function as a steered shaft, via a rack-and-pinion mechanism 13. The lower-end portion (pinion teeth) of the pinion shaft 11c is meshed with the rack shaft 12 (rack teeth 12b). Thus, the rotational motion of the steering shaft 11 is converted into a linear reciprocating motion of the rack shaft 12 in an axial direction X (lateral direction in FIG. 1) via the rack-and-pinion mechanism 13. The rack-and-pinion mechanism 13 includes the pinion teeth provided in the distal end portion of the pinion shaft 11c, and the rack teeth 12b provided in the rack shaft 12. The linear reciprocating motion is transmitted to tie rods 15 via rack ends 14 (end members) that are coupled to respective ends of the rack shaft 12. The motions of the tie rods 15 are transmitted to the right and left steered wheels 16, whereby the steered angle of the steered wheels 16 is changed.

The rack shaft 12 is housed in a rack housing 17. Rack boots 18 having a bellows tubular shape are disposed between respective ends of the rack housing 17 and the tie rods 15. The rack shaft 12 is disposed in the rack housing 17 and is supported by a rack guide 20 provided in the rack housing 17, such that the rack shaft 12 is able to reciprocate along the axial direction X while being urged toward the pinion shaft 11c.

The assist mechanism 3 is provided around the rack shaft 12. The assist mechanism 3 includes a motor 30 that is an assisting force generation source, a ball screw mechanism 40 attached around the rack shaft 12 in an integrated manner, and a speed reducer 50 that transmits a rotational force of a rotary shaft 31 of the motor 30 to the ball screw mechanism 40. The assist mechanism 3 converts the rotational force of the rotary shaft 31 of the motor 30 into a force of the rack shaft 12 in the axial direction X via the speed reducer 50 and the ball screw mechanism 40, thereby assisting a driver in performing a steering operation.

The ball screw mechanism 40, the speed reducer 50, the pinion shaft 11c, and the rack shaft 12 are covered with the rack housing 17. The rack housing 17 has an insertion portion 17a through which the rack shaft 12 is inserted. The insertion portion 17a extends in the axial direction X. The rack housing 17 includes a speed-reducer housing 17b that is a portion protruding in a direction (downward in FIG. 1) perpendicular to the extending direction of the rack shaft 12. The speed reducer 50 is partially housed in the speed-reducer housing 17b. A through-hole 33 is provided in a wall surface of the speed-reducer housing 17b (right wall of the speed-reducer housing 17b in FIG. 2). The rotary shaft 31 of the motor 30 extends into the speed-reducer housing 17b through the through-hole 33 provided in the speed-reducer housing 17b. The motor 30 is fixed to the speed-reducer housing 17b with a bolt 32 such that the rotary shaft 31 is positioned parallel to the rack shaft 12 and such that the motor 30 is positioned parallel to the rack shaft 12. A small clearance is left between the insertion portion 17a and the rack shaft 12 in the radial direction.

The ECU 4 controls the motor 30 based on detection results obtained by various sensors including a sensor 5 provided in a vehicle. The ECU 4 is provided so as to be integral with the motor 30. The sensor 5 is a rotation angle sensor that is provided on, for example, the pinion shaft 11c to detect a rotation angle of the pinion shaft 11c. Note that, the sensor 5 is not limited to a rotation angle sensor, and may be a torque sensor that detects a torque acting on the pinion shaft 11c.

Figure 2:
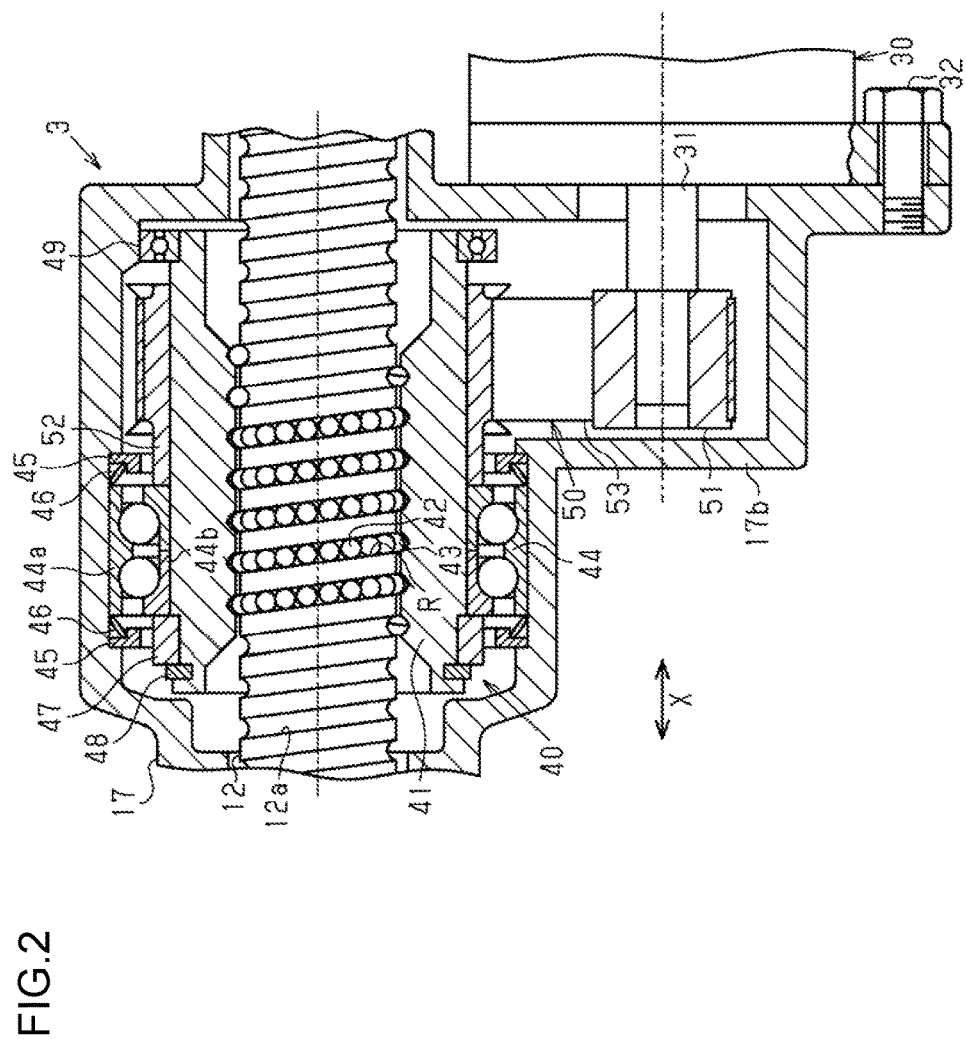
FIG. 2 is a sectional view illustrating the schematic structure of an assist mechanism in the steering system according to the embodiment.

Next, the assist mechanism 3 will be described in detail. As illustrated in FIG. 2, the ball screw mechanism 40 includes a nut 41 having a cylindrical shape and screwed to the rack shaft 12 via a plurality of balls 42. The nut 41 is supported by a bearing 44 so as to be rotatable relative to an inner peripheral surface of the rack housing 17. A thread groove 12a having a spiral shape is provided in an outer peripheral surface of the rack shaft 12. A thread groove 43 having a spiral shape and corresponding to the thread groove 12a of the rack shaft 12 is provided in an inner peripheral surface of the nut 41. A spiral space defined by the thread groove 43 of the nut 41 and the thread groove 12a of the rack shaft 12 functions as a rolling passage R in which the balls 42 roll. Although not illustrated, the nut 41 has a circulation passage that opens, at two points, into the rolling passage R and that serves as a shortcut connecting the two points to each other. Thus, the balls 42 can endlessly circulate through the rolling passage R via the circulation passage in the nut 41.

The bearing 44 is supported so as to be oscillatable relative to the rack housing 17 in the axial direction. On each of both sides of an outer ring 44a of the bearing 44 in the axial direction, a plate 45 having an annular shape and having an L-shaped section is provided and a disc spring 46 is provided between the plate 45 and the outer ring 44a. Each of both end surfaces of the outer ring 44a in the axial direction is in elastic contact with the plate 45 via the disc spring 46. An inner ring 44b of the bearing 44 is sandwiched, at its both sides in the axial direction, between a driven pulley 52 and a fixing member 47. The fixing member 47 is suppressed from detaching from the nut 41 by a fixing member 48 attached to the nut 41. An end portion (right end portion in FIG. 2) of the nut 41 is supported by the bearing 49 so as to be rotatable relative to the inner peripheral surface of the rack housing 17.

In the assist mechanism 3 thus configured, as the rotary shaft 31 of the motor 30 rotates, a drive pulley 51 rotates together with the rotary shaft 31 in an integrated manner. The rotation of the drive pulley 51 is transmitted to the driven pulley 52 via a belt 53, whereby the driven pulley 52 is rotated. Thus, the nut 41 that is attached to the driven pulley 52 in an integral manner also rotates together with the driven pulley 52 in an integrated manner. Because the nut 41 rotates relative to the rack shaft 12, the balls 42 interposed between the nut 41 and the rack shaft 12 endlessly circulate through the rolling passage R under loads applied from the nut 41 and the rack shaft 12. The balls 42 roll in the rolling passage R, whereby the rotational torque applied to the nut 41 is converted into an assisting force (steering assist force) that is applied in the axial direction X of the rack shaft 12. Thus, the rack shaft 12 moves relative to the nut 41 in the axial direction X. In other words, the ECU 4 controls the motor 30 in response to a driver's steering operation, thereby supplying the rack shaft 12 with an assisting force for moving the rack shaft 12 in the axial direction X (see FIG. 1).

Figure 3:
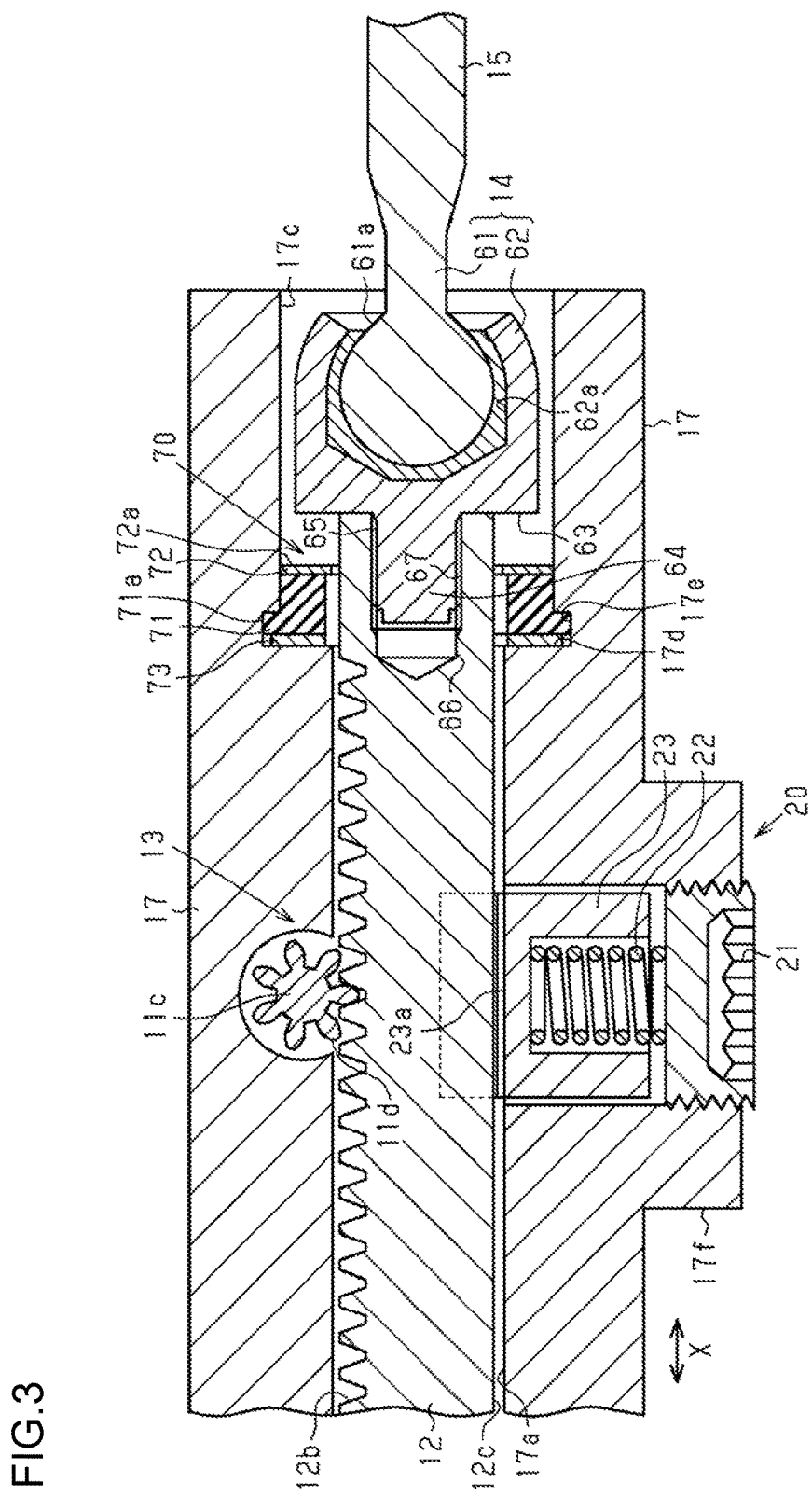
FIG. 3 is a sectional view illustrating the schematic structure of a rack end and its surroundings in the steering system according to the embodiment.

As illustrated in FIG. 3, each rack end 14 is a so-called ball joint, and includes a ball stud 61 having a ball portion 61a at its distal end, and a socket 62 by which the ball portion 61a is pivotably and tiltably held. A spherical seat 62a corresponding to the spherical shape of the ball portion 61a is disposed in the socket 62. The ball portion 61a is fitted into the spherical seat 62a, whereby the ball stud 61 is tiltably coupled to the socket 62. The tie rod 15 is fixedly connected to the ball portion 61a of the ball stud 61, whereby the tie rod 15 is tiltably coupled to the rack shaft 12.

The socket 62 is screwed into an end portion of the rack shaft 12, whereby the rack end 14 is fixed to the rack shaft 12. An end face 63 of the socket 62, which is on the rack shaft 12-side, is provided with a cylindrical portion 64 protruding toward the rack shaft 12. An outer peripheral surface of the cylindrical portion 64 is provided with an external thread 65. The end portion of the rack shaft 12 has a circular hole 66 that is concentric with the rack shaft 12. An inner peripheral surface of the rack shaft 12, which defines the circular hole 66, is provided with an internal thread 67 corresponding to the external thread 65. The external thread 65 is screwed into the internal thread 67, whereby the socket 62 is fixed to the end portion of the rack shaft 12. The end face 63 of the socket 62 is in contact with an end face of the rack shaft 12.

An end portion of the rack housing 17 has a diameter-increased portion 17c into which the socket 62 is inserted. The bore diameter of the diameter-increased portion 17c is set larger than the bore diameter of the insertion portion 17a. A restricting surface 17d perpendicular to the axial direction X is provided at the boundary between the insertion portion 17a and the diameter-increased portion 17c. The outside diameter of the socket 62 is set larger than the bore diameter of the insertion portion 17a of the rack housing 17, and is set smaller than the bore diameter of the diameter-increased portion 17c. Thus, when the rack shaft 12 moves, the end face 63 comes into contact with the restricting surface 17d, and in the present embodiment, the end face 63 of the socket 62 comes into contact with the restricting surface 17d via a shock-absorbing member 70, that is, an end contact occurs. In order to reduce an impact load at the time of end contact, the shock-absorbing member 70 is provided between the restricting surface 17d of the rack housing 17 and the end face 63 of the rack end 14.

The shock-absorbing member 70 includes an elastic portion 71 having a cylindrical shape, and end plates 72, 73 having an annular shape and provided on respective side surfaces of the elastic portion 71 in the axial direction. The elastic portion 71 is made of elastomer containing rubber, synthetic resin, or the like. The outer periphery of an end portion (left end portion in FIG. 3) of the elastic portion 71, which is on the restricting surface 17d-side, is provided with a flange portion 71a. The flange portion 71a is fitted into a recessed portion 17e provided in the diameter-increased portion 17c, whereby the elastic portion 71 is attached to the rack housing 17. The bore diameter of the elastic portion 71 is set larger than the outside diameter of the rack shaft 12.

The end plates 72, 73 each have an elastic modulus that is higher than that of the elastic portion 71. The outside diameter of the end plate 72 is set slightly smaller than the bore diameter of the diameter-increased portion 17c of the rack housing 17. The outside diameter of the end plate 73 is set slightly smaller than the bore diameter of the recessed portion 17e of the diameter-increased portion 17c. The end plate 72 is disposed so as to be in contact with a first end face (right end face in FIG. 3) of the elastic portion 71. The first end face is on the side opposite of the elastic portion 71 from the restricting surface 17d. The end plate 73 is kept in contact with a second end face (left end face in FIG. 3) of the elastic portion 71. The second end face is on the restricting surface 17d-side. The second end face of the elastic portion 71 is kept in contact with the restricting surface 17d via the end plate 73. The end plates 72, 73 are provided, and thus an impact load generated when the end face 63 comes into contact with the restricting surface 17d via the shock-absorbing member 70 acts on the elastic portion 71 while being dispersed. An end face of the end plate 72, which is on the rack end 14-side, functions as a contact face 72a that comes into contact with the end face 63 of the rack end 14 at the time of end contact.

End contact, that is, a phenomenon in which the end face 63 comes into contact with the restricting surface 17d via the shock-absorbing member 70, is classified into end contact due to a normal input in which the rack shaft 12 moves in the axial direction in response to a driver's steering operation and end contact due to a reverse input in which the rack shaft 12 moves in the axial direction in response to an impact load caused, for example, when the steered wheel 16 runs onto a curbstone. In this case, a load due to a reverse input (reverse input load) is assumed to be higher than a load due to a normal input (normal input load).

The rack guide 20 includes a plug 21, an urging member 22, and a support yoke 23. The plug 21 is attached to an opening portion of a tubular guide attachment portion 17f provided on an outer peripheral surface of the rack housing 17. The urging member 22 has an elastic force. The support yoke 23 is provided so as to be movable toward or away from the plug 21. The support yoke 23 is pressed, by the elastic force of the urging member 22, against a back face 12c of the rack shaft 12. The back face 12c is on the opposite side of the rack shaft 12 from the rack teeth 12b. The support yoke 23 has a guide surface 23a that corresponds to a semi-cylindrical shape (having a half-arc-shaped section) of the back face 12c of the rack shaft 12. The support yoke 23 is pressed against the rack shaft 12 by the urging member 22, whereby the rack teeth 12b of the rack shaft 12 are reliably meshed with the pinion teeth 11d of the pinion shaft 11c.

In the insertion portion 17a of the rack housing 17, the rack shaft 12 is supported by the rack guide 20 while being pressed so as to be meshed with the pinion shaft 11c.

As illustrated in FIG. 1, the ECU 4 detects a position of the rack shaft 12 in the axial direction X (which may be a position of the rack end 14, for example) based on detection results obtained by the sensor 5. Specifically, the ECU 4 detects a moving distance (stroke amount) of the rack shaft 12 in the axial direction X from a neutral position of the rack shaft 12 based on the rotation angle of the pinion shaft 11c detected by the sensor 5, thereby detecting the position of the rack shaft 12 in the axial direction X. In other words, there is a certain relationship between the rotation angle of the pinion shaft 11c and the moving distance of the rack shaft 12 in the axial direction X, and the range in which the pinion shaft 11c can rotate corresponds to the range in which the rack shaft 12 can move.

The ECU 4 changes the mode of controlling the motor 30 based on the position of the rack shaft 12 in the axial direction X. Specifically, when the movement position of the rack shaft 12 in the axial direction X has reached a prescribed position near the stroke end in a steering operation (when the rack end 14 has approached the shock-absorbing member 70), the ECU 4 executes electronic stopper control of reducing or cutting off an assisting force to be applied from the motor 30 to the rack shaft 12 in order to restrict the movement of the rack shaft 12 toward the stroke end. The ECU 4 executes the electronic stopper control, thereby electronically creating a normal input end that is a stroke end in a steering operation.

Figure 4:
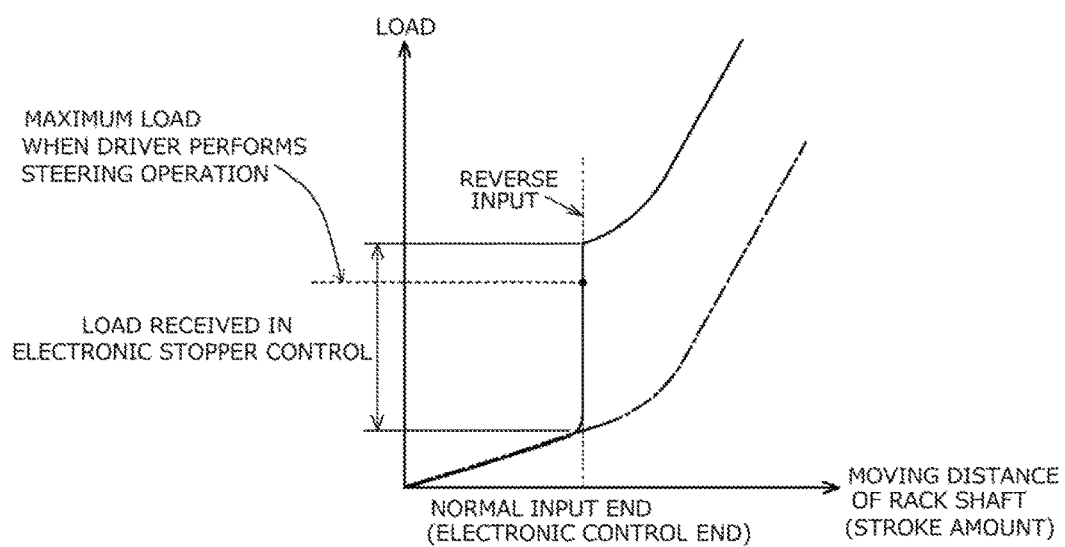
FIG. 4 is a graph illustrating the relationship between the moving distance of a rack shaft and the load.

FIG. 4 is a graph schematically illustrating the relationship between the moving distance (stroke amount) of the rack shaft 12 in the axial direction X and the load (stress) acting on the elastic portion 71. For the sake of convenience, the scales of the coordinates are not completely made uniform.

As indicated by a long dashed short dashed line in FIG. 4, when the normal input end is not created, the load gradually increases as the moving distance of the rack shaft 12 increases. This is because the load is transmitted between the rack end 14 and the rack housing 17 through the elastic portion 71. In other words, the elastic portion 71 absorbs the impact load, thereby suppressing the load from abruptly increasing. When the load acting on the elastic portion 71 exceeds a certain load, the rate of increase (slope) of the load relative to the moving distance of the rack shaft 12 further increases.

As indicated by a continuous line in FIG. 4, in a case where the normal input end (electronic control end) is created, until a certain moving distance of the rack shaft 12 is achieved, the elastic portion 71 absorbs the load in the same manner as in the case where the normal input end is not created and thus the load gradually increases depending on the moving distance of the rack shaft 12. When the rack shaft 12 (specifically, the end face 63 of the rack end 14) has reached the normal input end, the movement of the rack shaft 12 in the axial direction X is suppressed or restricted, and thus the moving distance of the rack shaft 12 does not change until a reverse input load higher than the normal input load (the maximum load when the driver performs a steering operation) is applied. When the reverse input load is applied, the elastic portion 71 is further compressed, whereby the moving distance of the rack shaft 12 increases beyond the normal input end. The elastic portion 71 absorbs a higher impact load in a manner such that a load received in the electronic stopper control is offset.

In view of the foregoing description, in order to make the normal input end (blocked feel) clearly recognizable, it is preferable that the ECU 4 execute the electronic stopper control. In contrast to this, when the electronic stopper control is not executed, it is difficult for a driver to recognize the stroke limit position (normal input end) of the rack shaft 12 due to an elastic feel given by the elastic portion 71.

Figure 5:
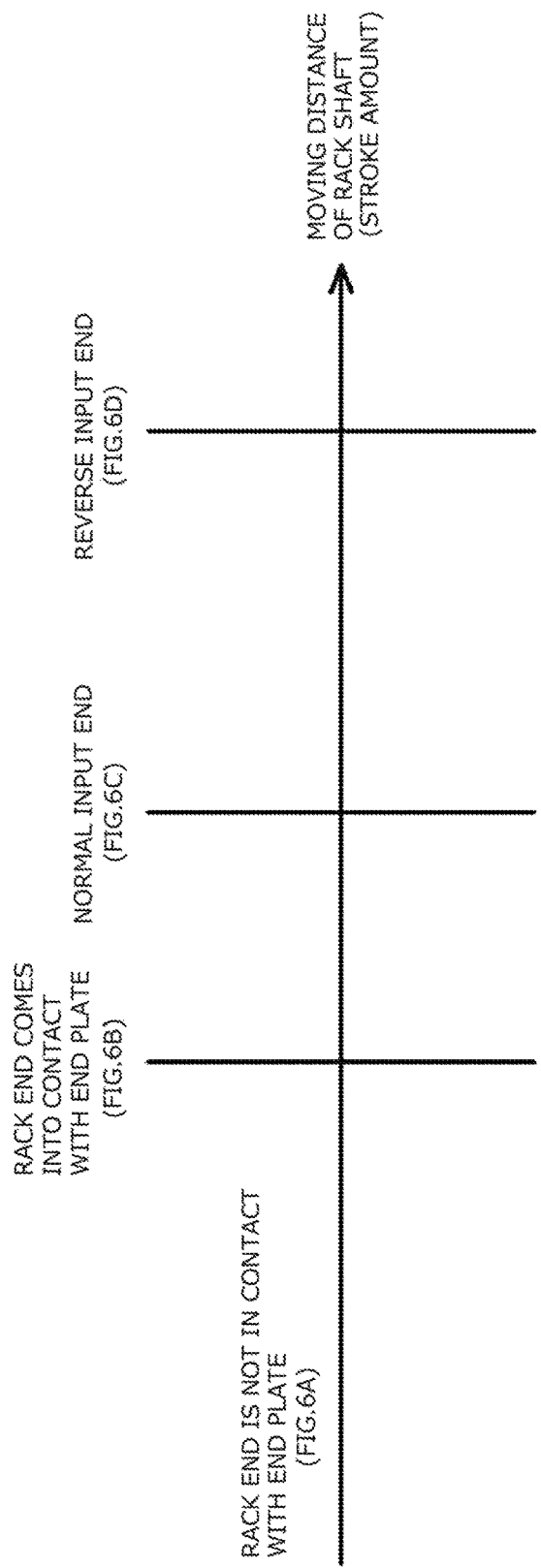
FIG. 5 is a schematic diagram illustrating the relationship between the moving distance of the rack shaft and the state of a shock-absorbing member.
Figure 6A:
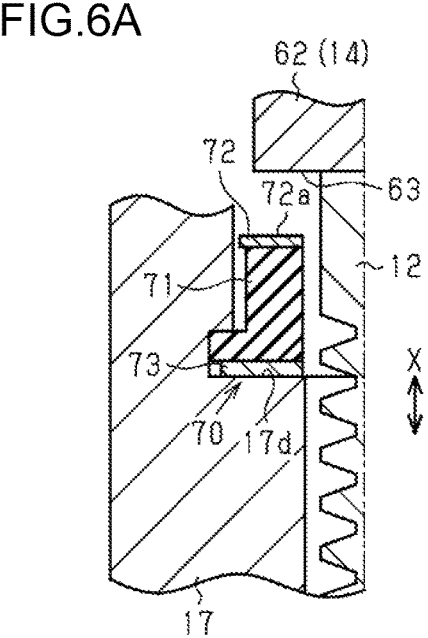
FIG. 6A is a sectional view illustrating the schematic structure of the rack end and its surroundings when a load is applied.
Figure 6B:
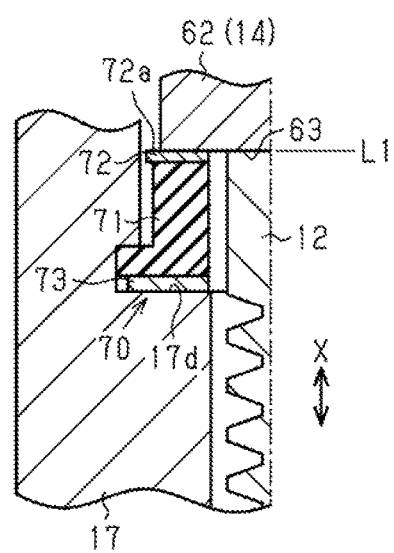
FIG. 6B is a sectional view illustrating the schematic structure of the rack end and its surroundings when the load is applied.
Figure 6C:
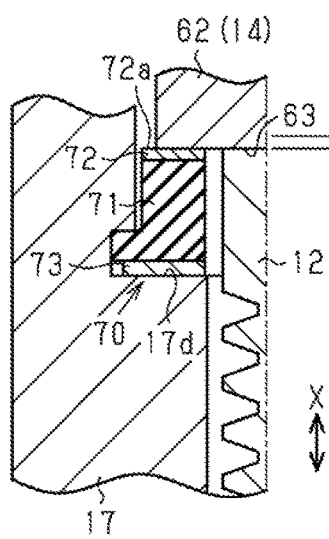
FIG. 6C is a sectional view illustrating the schematic structure of the rack end and its surroundings when the load is applied.
Figure 6D:
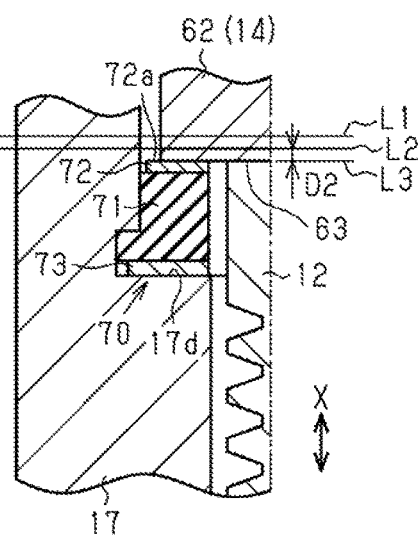
FIG. 6D is a sectional view illustrating the schematic structure of the rack end and its surroundings when the load is applied.

Next, the relationship between the moving distance of the rack shaft 12 and the state of the shock-absorbing member 70 will be briefly described. As illustrated in FIG. 5, when the rack shaft 12 further moves in the axial direction X from a position in a non-contact state (FIG. 6A) in which the rack end 14 is not in contact with the shock-absorbing member 70 (end plate 72), the rack end 14 comes into contact with the end plate 72 (FIG. 6B). When the rack shaft 12 further moves in the axial direction X, the normal input end that is created through the electronic stopper control as a stroke end in a steering operation of the rack shaft 12 restricts movement of the rack shaft 12 in the axial direction X (FIG. 6C). When a reverse input load higher than the normal input load acts on the rack shaft 12, the rack shaft 12 moves beyond the normal input end to the reverse input end that is a position (physical stroke end) at which the elastic portion 71 of the shock-absorbing member 70 is fully compressed (FIG. 6D).

Next, the relationship between the moving distance of the rack shaft 12 and the state of the shock-absorbing member 70 will be described in detail, and the normal input end created through the electronic stopper control will be described. FIG. 6A illustrates a state where end contact has not occurred. In this case, the end face 63 of the rack end 14 (socket 62) and the contact face 72a of the end plate 72 are apart from each other. When a normal input load in response to a steering operation or a reverse input load from the steered wheel 16-side is applied to the rack shaft 12 in a state where end contact has not occurred, and the rack shaft 12 moves in a direction (axial direction X) in which the end face 63 of the rack end 14 moves closer to or apart from the restricting surface 17d of the rack housing 17 based on the direction of the normal input load or the reverse input load.

As illustrated in FIG. 6B, when the rack shaft 12 further moves closer to the normal input end (stroke end) (when the steering wheel 10 is steered toward the operation limit), the end face 63 of the rack end 14 comes into contact with the contact face 72a of the end plate 72. In this state, a high load is not acting on the elastic portion 71 of the shock-absorbing member 70, and thus the length of the elastic portion 71 in the axial direction X is the same as that of the elastic portion 71 when end contact has not occurred, as illustrated in FIG. 6A. The position of the contact face 72a of the shock-absorbing member 70, which is on the rack end 14-side in the axial direction X, in this state is defined as a position L1. When the rack shaft 12 further moves such that the end face 63 of the rack end 14 approaches the restricting surface 17d of the rack housing 17, the elastic portion 71 starts to be compressed in accordance with this movement. Specifically, when the end face 63 moves beyond the position L1 to approach the restricting surface 17d, the elastic portion 71 of the shock-absorbing member 70 is compressed while being sandwiched between the end face 63 and the restricting surface 17d.

As illustrated in FIG. 6C, when the rack shaft 12 further moves beyond the position L1 to come closer to the normal input end (when the steering wheel 10 is steered to the operation limit), the elastic portion 71 is further compressed, and accordingly the length of the shock-absorbing member 70 (elastic portion 71) in the axial direction X further decreases. At the timing when the rack shaft 12 reaches a position L2, the normal input end is created through the electronic stopper control, whereby the movement of the rack shaft 12 in a direction in which the end face 63 moves closer to the restricting surface 17d is restricted. In this case, the normal input end is set to such a position that the elastic portion 71 is compressed by a compression amount (distortion) D1 (=L1−L2) that is a distance between the position L1 and the position L2. The compression amount D1, in other words, the position of the normal input end, is set based on various factors, such as the durable number of times that the elastic portion 71 can be used (hereinafter, referred to as "the durable number of times of usage of the elastic portion 71") (the service life of the elastic portion 71), the difference between the minimum turning radius of the vehicle at the time of normal input end and the minimum turning radius at the time of reverse input end, steering feeling (elastic feel due to the elastic portion 71), and the shock-absorbing property of the shock-absorbing member 70 (elastic portion 71).

Figure 7:
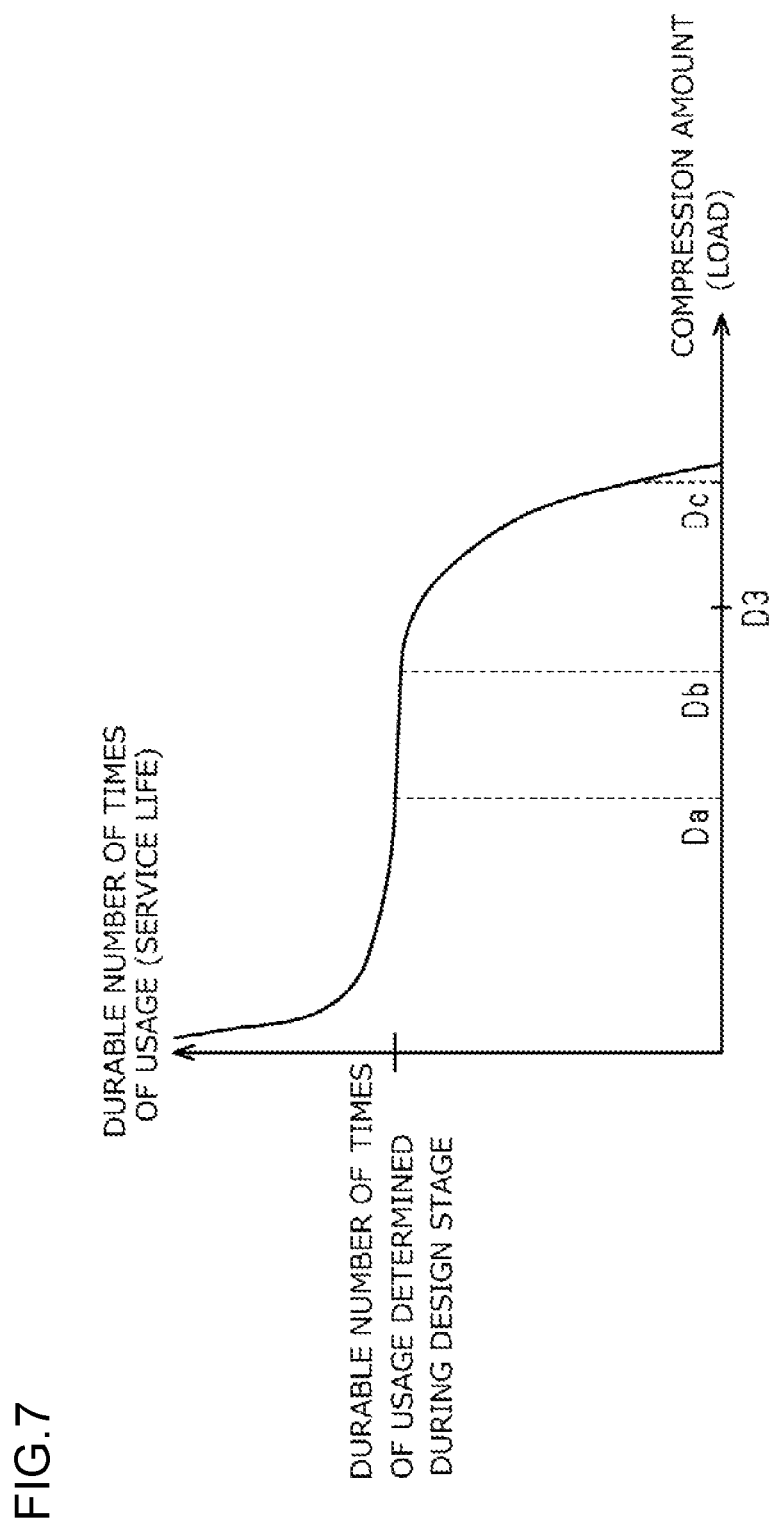
FIG. 7 is a graph illustrating the relationship between the compression amount of the shock-absorbing member and the durable number of times of usage of the shock-absorbing member.

As illustrated in FIG. 7, there is a trade-off relationship between the compression amount (load) and the durable number of times of usage of the elastic portion 71 (the service life of the elastic portion 71). In other words, the durable number of times of usage of the elastic portion 71 decreases as the compression amount increases. Note that the durable number of times of usage of the elastic portion 71 is set to the number of times that the elastic portion 71 can be used with its elasticity hardly lost even when the elastic portion 71 is compressed by a certain compression amount. The durable number of times of usage of the elastic portion 71 is associated with the number of times that end contact occurs in the EPS 1, and the service life of the shock-absorbing member 70 (the durable number of times of usage of the shock-absorbing member 70) increases as the durable number of times of usage of the elastic portion 71 becomes larger.

The position of the normal input end, in other words, the compression amount D1, is determined based on the durable number of times of usage of the shock-absorbing member 70 (elastic portion 71), which is predicted during the stage of design. In other words, the durable number of times of usage of the shock-absorbing member 70 is predicted in consideration of the required useful life of the shock-absorbing member 70. Then, the compression amount D1 is set to such a compression amount that the durable number of times of usage of the elastic portion 71 is achieved, that is, the elastic portion 71 can be used the durable number of times. In order to ensure sufficient shock-absorbing property while achieving the durable number of times of usage of the elastic portion 71, the compression amount D1 is preferably set to be as large as possible.

For example, the compression amount D1 corresponding to the normal input end may be set to any compression amount as long as the elastic portion 71 can be used more than the durable number of times of usage, which is determined during the stage of design, when the elastic portion 71 is compressed by a compression amount (a compression amount Da or a compression amount Db that is larger than the compression amount Da) that is smaller than a compression amount D3 at which the elastic limit is reached. In a case where the durable number of times of usage of the elastic portion 71 when the compression amount D1 is set to the compression amount Da is substantially equal to the durable number of times of usage of the elastic portion 71 when the compression amount D1 is set to the compression amount Db, the compression amount D1 is preferably set to the compression amount Db at which a higher shock-absorbing property is ensured. When the compression amount D1 corresponding to the normal input end is set to a compression amount Dc that is larger than the compression amount D3 at which the elastic limit of the elastic portion 71 is reached, it is predicted that the durable number of times of usage, which is determined during the stage of design, cannot be achieved. This is because, once the elastic portion 71 exceeds the elastic limit, the elastic portion 71 is plastically deformed and cannot completely return to its original state before being compressed. This significantly deteriorates the shock-absorbing property of the elastic portion 71, resulting in a significant decrease in the durable number of times of usage of the elastic portion 71. Even when the compression amount D1 can be set to the compression amount Dc that is larger than the compression amount Db, the durable number of times of usage of the elastic portion 71 is significantly decreased. Therefore, it is not preferable to set the compression amount D1 corresponding to the normal input end to a compression amount close to the compression amount Dc unless it is determined that a smaller number of times of usage of the elastic portion 71 is sufficient. When the durable number of times of usage of the elastic portion 71, which is predicted during the stage of design, can be achieved even if the compression amount D1 corresponding to the normal input end is set to be substantially equal to the compression amount Dc, the compression amount D1 corresponding to the normal input end may be set to the compression amount Dc.

In view of the foregoing description, the normal input end is set to the position L2 at which the shock-absorbing member 70 is compressed by the compression amount D1. In this example, the position L2 of the normal input end is set to such a position that the elastic portion 71 does not reach the elastic limit. The distance between the end face of the elastic portion 71, which is on the end plate 72-side, and the position L2 is shorter than the distance between the end face of the elastic portion 71, which is on the end plate 73-side, and the position L2.

When the steering wheel 10 is steered by a driver in the reverse direction in a state where the elastic portion 71 has been compressed by the compression amount D1 as illustrated in FIG. 6C, the end face 63 moves away from the restricting surface 17d. As the end face 63 moves away from the restricting surface 17d, the elastic portion 71 expands in the axial direction X, and returns to the state where end contact has not occurred as illustrated in FIG. 6A, after undergoing the state illustrated in FIG. 6B.

As illustrated in FIG. 6D, when a reverse input load that is larger than the normal input load acts on the rack shaft 12 and thus the rack shaft 12 moves beyond the position L2 of the normal input end, the elastic portion 71 is further compressed. When the elastic portion 71 is fully compressed by the reverse input load, the elastic portion 71 can no longer be physically compressed, and thus the movement of the rack shaft 12 in a direction in which the end face 63 approaches the restricting surface 17d is mechanically restricted at a position L3. Unless deformation of the rack housing 17 or the like occurs, the rack shaft 12 cannot move any further. Note that, the position L3 varies depending on the magnitude of the reverse input load.

The elastic portion 71 has a compression margin D2 (=L2−L3) corresponding to a distance from the position L2 of the normal input end in FIG. 6C to the position L3 at which the elastic portion 71 is fully compressed as illustrated in FIG. 6D. The compression margin D2 is a compression amount by which the elastic portion 71 can be compressed. Even when the rack shaft 12 has reached the normal input end, the elastic portion 71 can still be compressed by an amount corresponding to the compression margin D2. Thus, even when a reverse input load is applied to the rack shaft 12, an impact load due to the reverse input can be absorbed as the elastic portion 71 is compressed. The elastic portion 71 is very rarely compressed to the position L3 of the reverse input end. Therefore, the durable number of times of usage of the elastic portion 71 that is set for the case where the elastic portion 71 is compressed to the reverse input end may be several times or may be once.

Figure 8:
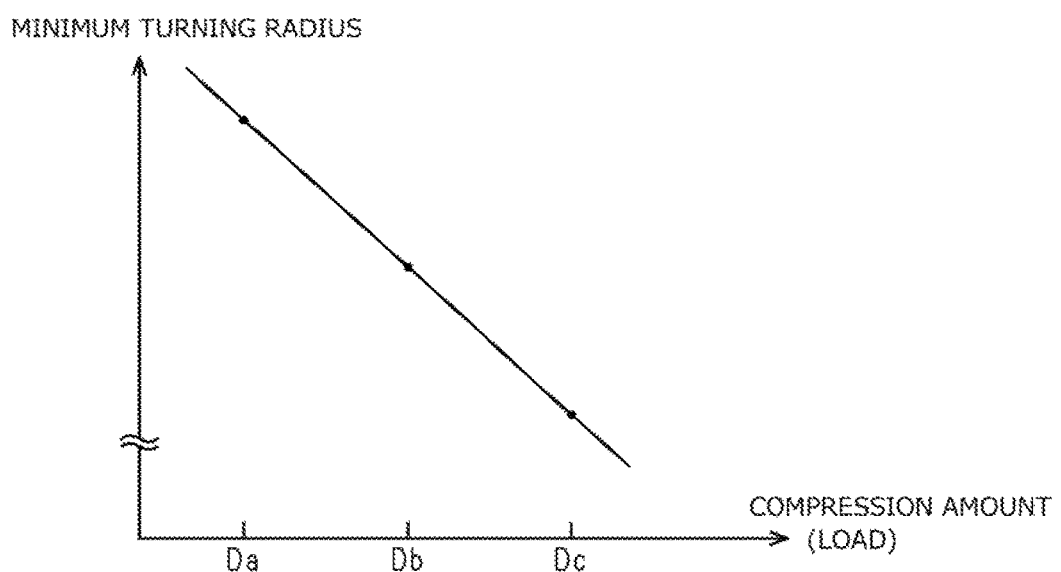
FIG. 8 is a graph illustrating the relationship between the compression amount of the shock-absorbing member and the minimum turning radius of a vehicle.

Next, the relationship between the compression amount and the minimum turning radius of the vehicle will be described. As illustrated in FIG. 8, the compression amount and the minimum turning radius of the vehicle has such a relationship that the minimum turning radius of the vehicle decreases as the compression amount increases. Specifically, the minimum turning radius of the vehicle decreases as the compression amount increases in the order of the compression amount Da, the compression amount Db, and the compression amount Dc. This is because a larger compression amount of the elastic portion 71 allows the rack shaft 12 to move by a larger amount in the axial direction X, thereby increasing the steered angle (turning angle) of the steered wheels 16. Because the vehicle can make tighter turns with a smaller minimum turning radius, a larger compression amount of the elastic portion 71 is preferable from the viewpoint of the minimum turning radius. However, if the compression amount of the elastic portion 71 is set excessively large, the durable number of times of usage of the elastic portion 71 decreases as described above.

In this regard, in the present embodiment, the normal input end is set to the position L2, whereby the compression amount is set such that the minimum turning radius is set as small as possible while the sufficient durable number of times of usage of the elastic portion 71 is ensured. Furthermore, the minimum turning radius can be set smaller than that in a case where the normal input end is created through the electronic stopper control before the shock-absorbing member 70 (elastic portion 71) is compressed. Thus, the minimum turning radius (steered angle) at the normal input end can be set closer to the minimum turning radius (steered angle) at the reverse input end. In other words, the normal input end created through the electronic stopper control is set closer to the reverse input end, and the difference between the minimum turning radius at the normal input end and the minimum turning radius at the reverse input end is decreased accordingly. Thus, the steering performance at the time of reverse input end does not significantly differ from the steering performance at the time of normal input end. Consequently, a driver can perform a steering operation with the same feeling as that in normal times.

Next, advantageous effects of the present embodiment will be described. Even when the shock-absorbing member 70 including the elastic portion 71 is used, the normal input end can be clearly set through the electronic stopper control. A force (steering torque) required for a driver to perform a steering operation increases, and accordingly it becomes difficult to turn the steering wheel 10 in a direction in which the shock-absorbing member 70 is further compressed, which gives the driver a blocked feel. Thus, the driver can clearly recognize the normal input end in performing a steering operation.

The normal input end is set to a position at which there is still the compression margin D2 relative to the position L3 at which the shock-absorbing member 70 (elastic portion 71) is fully compressed. Thus, even when a reverse input load is applied to the rack shaft 12, the shock-absorbing member 70 is compressed, whereby the reverse input load can be absorbed.

The normal input end is set based on the compression amount corresponding to the required durable number of times of usage of the elastic portion 71, which is determined during the stage of design. Thus, the required durable number of times of usage of the elastic portion 71 (the service life of the elastic portion 71) can be ensured while an increase in the minimum turning radius of the vehicle is suppressed. This is because, the elastic portion 71 can be suppressed from plastically deforming at the time of a normal steering operation, for example, by setting the normal input end to a position at which the elastic portion 71 is compressed by such a compression amount that the elastic portion 71 does not reach the elastic limit.

The normal input end is set to the position (position L2) at which the shock-absorbing member 70 has been compressed by a certain amount, whereby the shock-absorbing member 70 can absorb an impact before the rack shaft 12 reaches the normal input end. In other words, when the rack shaft 12 has reached the normal input end, the movement of the rack shaft 12 due to a normal input load is restricted through the electronic stopper control, and further, the movement of the rack shaft 12 is suppressed as the shock-absorbing member 70 is compressed by the compression amount D1.

After the shock-absorbing member 70 is compressed by a certain amount, the normal input end is set through the electronic stopper control. Thus, even when the electronic stopper control is executed at the position L2, an impact is reduced as the shock-absorbing member 70 is compressed. Thus, it is possible to reduce or eliminate the momentum of reduction or stoppage of an assisting force through the electronic stopper control. It is also possible to reduce the momentum of movement of the rack shaft 12 in a direction in which the shock-absorbing member 70 is decompressed, from the state where movement of the rack shaft 12 is restricted at the normal input end.

The present embodiment may be modified as follows. The following embodiments may be combined with each other unless a technical contradiction arises. In the present embodiment, the ECU 4 detects a position of the rack shaft 12 in the axial direction X based on detection results obtained by the sensor 5. However, an object to be detected is not limited to a position of the rack shaft 12 in the axial direction X. For example, based on detection results obtained by the sensor 5, the ECU 4 may detect a moving velocity of the rack shaft 12 in the axial direction X. In this case, based on the moving velocity of the rack shaft 12, the ECU 4 predicts whether the rack end 14 comes into contact with the rack housing 17 via the shock-absorbing member 70, that is, whether an impact load is applied to the shock-absorbing member 70. The ECU 4 may change control modes of the electronic stopper control based on the moving velocity of the rack shaft 12. For example, movement of the rack shaft 12 may be suppressed more quickly through the electronic stopper control, as the moving velocity of the rack shaft 12 is higher.

In the present embodiment, the ECU 4 is provided so as to be integral with the motor 30. Alternatively, the ECU 4 and the motor 30 may be provided separately from each other. In the present embodiment, the shock-absorbing member 70 is attached to the rack housing 17 by fitting the flange portion 71a of the elastic portion 71 into the recessed portion 17e. However, the attachment position of the shock-absorbing member 70 is not limited to this. The shock-absorbing member 70 may be attached to, for example, the end face 63 of the rack end 14.

In the present embodiment, the elastic portion 71 is sandwiched between the end plates 72, 73. However, the configuration is not limited to this. Specifically, only one of the end plates 72, 73 may be provided, or the elastic portion 71 may be sandwiched directly between the end face 63 and the restricting surface 17d.

In the present embodiment, when the rack shaft 12 reaches the stroke end (normal input end) in a steering operation, the ECU 4 executes the electronic stopper control, thereby reducing an assisting force in the same direction as that of the driver's steering operation or stopping generation of such an assisting force, to restrict movement of the rack shaft 12 in the axial direction X. However, control executed by the ECU 4 is not limited to this. For example, the ECU 4 may control the motor 30 to generate a restricting force (e.g., an assisting force in a direction opposite to that of the driver's steering operation) for restricting movement of the rack shaft 12 in a direction in which the shock-absorbing member 70 is further compressed beyond the normal input end. Specifically, when the rack shaft 12 has reached the vicinity of the normal input end, the ECU 4 reduces an assisting force in the same direction as that of the driver's steering operation, thereby restricting (suppressing) movement of the rack shaft 12 in the axial direction X beyond the normal input end. Reducing or stopping an assisting force from the normal assisting force can be apparently regarded as generating a restricting force that is a force for restricting movement of the rack shaft 12 in a direction in which the shock-absorbing member 70 is compressed.

In the present embodiment, the ECU 4 may control the motor 30 so as to gradually reduce an assisting force as the rack shaft 12 approaches the normal input end. Thus, an impact load generated by abruptly stopping the rack shaft 12 when the rack shaft 12 reaches the normal input end is reduced. Consequently, hitting noise generated when the rack end 14 comes into contact with the shock-absorbing member 70 can be reduced. In this case as well, it is preferable to gradually reduce an assisting force while taking into account the end feel of the normal input end.

In the present embodiment, the ECU 4 executes the electronic stopper control based on the moving distance of the rack shaft 12 in the axial direction X. However, the electronic stopper control is not limited to this. The ECU 4 may execute the electronic stopper control, based on, for example, information that can be converted into the moving distance of the rack shaft 12 in the axial direction X using, instead of the moving distance of the rack shaft 12 in the axial direction X. Examples of the information that can be converted into the moving distance of the rack shaft 12 in the axial direction X include the rotation angle of the pinion shaft 11c.

In the present embodiment, the normal input end is set to a position at which the shock-absorbing member 70 has been compressed by the compression amount D1. However, the position of the normal input is not limited to this. The normal input end may be set to, for example, a position at which the end face 63 of the rack end 14 comes into contact with the contact face 72a of the shock-absorbing member 70. Even in this case, a compression margin is left relative to the position L3 at which the shock-absorbing member 70 (elastic portion 71) is fully compressed. Thus, even when a reverse input load is applied to the rack shaft 12, an impact load due to the reverse input can be absorbed as the elastic portion 71 is compressed.

In the present embodiment, the invention is applied to the EPS 1 that applies an assisting force to the rack shaft 12 by the motor 30 having the rotary shaft 31 disposed parallel to the rack shaft 12. However, the apparatus to which the invention is applied is not limited to this. The invention may be applied to, for example, an EPS 1 that applies an assisting force generated by the motor 30 to the steering shaft 11. The invention may also be applied to a steering system that transmits torque generated by the motor 30 to the pinion shaft 11c via a worm speed reducer. The invention is applied to the electric power steering system in which a rotational force generated by the motor 30 is used to assist the linear motion of the rack shaft 12 that is caused in response to a steering operation. Alternatively, the invention may be applied to a steer-by-wire steering system. When the invention is applied to a steer-by-wire steering system, the invention may be applied not only to a front-wheel steering system, but also to a rear-wheel steering system or a four-wheel steering system.

Next, technical ideas that can be understood from the above-described embodiment and modified examples will be described below. Preferably, the shock-absorbing member includes the elastic portion made of elastomer and the two end plates that are attached to respective end faces of the elastic portion in the axial direction of the steered shaft and that are respectively brought into contact with the housing and the rack end. The position of the steered shaft when the shock-absorbing member and the rack end come into contact with each other in a state where the shock-absorbing member still has the compression margin is preferably determined in consideration of the service life of the elastic portion.

With this configuration, the position of the steered shaft when the shock-absorbing member and the rack end come into contact with each other in a state where the shock-absorbing member still has the compression margin is determined in consideration of the service life of the elastic portion. This enables the design that can further increase the service life of the elastic portion.

What is claimed is:

1. A steering system comprising:
a steering mechanism including a steered shaft configured to move in an axial direction of the steered shaft to steer steered wheels, and a steering shaft configured to rotate in response to a movement of the steered shaft in the axial direction;
a motor configured to apply a steering assist force for steering the steered wheels to the steering mechanism;
a housing in which the steered shaft is housed;
an end member fitted to an end portion of the steered shaft, the end member being coupled to a corresponding one of the steered wheels;
a shock-absorbing member provided between an end face of the housing and an end face of the end member in the axial direction of the steered shaft, the shock-absorbing member being configured to absorb an impact by being compressed; and
a control unit configured to control the motor such that, when the shock-absorbing member and the end member come into contact with each other in a state where the shock-absorbing member still has a compression margin, generation of the steering assist force in a direction in which the shock-absorbing member is further compressed is stopped or reduced.

2. The steering system according to claim 1, wherein:
a position of the steered shaft at which the shock-absorbing member and the end member come into contact with each other in the state where the shock-absorbing member still has the compression margin is a movement limit of the steered shaft in a steering operation; and
the movement limit is set to a position, in the axial direction of the steered shaft, between a position at which the end face of the end member and the shock-absorbing member come into contact with each other and a position at which the shock-absorbing member is fully compressed.

3. The steering system according to claim 1, wherein:
a position of the steered shaft at which the shock-absorbing member and the end member come into contact with each other in the state where the shock-absorbing member still has the compression margin is a movement limit of the steered shaft in a steering operation, and
the movement limit is set to a position at which a distance between the movement limit and a position at which the end face of the end member and the shock-absorbing member come into contact with each other is shorter than a distance between the movement limit and the end face of the housing.

4. The steering system according to claim 2, wherein the control unit is configured to stop or reduce generation of the steering assist force by controlling the motor to apply, to the steering mechanism, a restricting force for suppressing the steered shaft from further moving beyond the movement limit in a direction in which the shock-absorbing member is compressed.

5. The steering system according to claim 1 further comprising a sensor configured to detect a position of the steered shaft in the axial direction,
 wherein the control unit is configured to stop or reduce generation of the steering assist force, based on the position of the steered shaft in the axial direction.

6. The steering system according to claim 1, wherein:
 a compression amount of the shock-absorbing member and the durable number of times of usage of the shock-absorbing member when the shock-absorbing member is repeatedly compressed by a certain amount have a relationship in which the durable number of times of usage of the shock-absorbing member decreases as the compression amount of the shock-absorbing member increases; and
 a position of the steered shaft at which the shock-absorbing member and the end member come into contact with each other in the state where the shock-absorbing member still has the compression margin is determined based on the compression amount of the shock-absorbing member corresponding to the durable number of times of usage of the shock-absorbing member, which is determined during a stage of design.

7. The steering system according to claim 1, wherein the control unit is configured to control the motor to further reduce the steering assist force as the steered shaft approaches a position of the steered shaft at which the shock-absorbing member and the end member come into contact with each other in the state where the shock-absorbing member still has the compression margin.

8. The steering system according to claim 1 further comprising a speed reducer,
 wherein the speed reducer includes a drive pulley attached to a rotary shaft of the motor, a driven pulley configured to transmit the steering assist force generated by the motor to the steered shaft, and a belt looped over the drive pulley and the driven pulley.

* * * * *